United States Patent [19]

Streicher et al.

[11] Patent Number: 4,549,896
[45] Date of Patent: Oct. 29, 1985

[54] APPARATUS AND METHOD FOR REMOVING GASEOUS INCLUSIONS FROM MOLTEN MATERIAL

[75] Inventors: William L. Streicher; Mark A. Propster, both of Granville, Ohio

[73] Assignee: Owens-Corning Fiberglas Corporation, Toledo, Ohio

[21] Appl. No.: 644,476

[22] Filed: Aug. 27, 1984

[51] Int. Cl.4 .............................................. C03B 5/16
[52] U.S. Cl. ...................................... 65/135; 65/134; 65/178; 55/15
[58] Field of Search ................. 65/134, 135, 136, 178, 65/179; 55/15

[56] References Cited

U.S. PATENT DOCUMENTS

| 2,635,388 | 4/1953 | Peyches et al. | 65/178 X |
| 3,151,958 | 10/1964 | Bodine | 55/15 |
| 3,284,991 | 11/1966 | Ploeger et al. | 55/15 |
| 3,904,392 | 9/1975 | Vaningen et al. | 55/15 |
| 4,316,734 | 2/1982 | Spinosa et al. | 65/135 |

FOREIGN PATENT DOCUMENTS 837937  6/1981  U.S.S.R. ................. 65/178

Primary Examiner—Arthur Kellogg
Attorney, Agent, or Firm—Ronald C. Hudgens; Patrick P. Pacella

[57] ABSTRACT

A process and apparatus for improving the removal of gaseous inclusions from molten materials is disclosed. The inclusions, e.g., seeds or bubbles, are removed by applying vibrations to a restricted zone for discharging molten material from the melting tank. The seeds are slowed during a "pile up" in the restricted channel and are more easily brought to the surface of the molten material.

12 Claims, 2 Drawing Figures

APPARATUS AND METHOD FOR REMOVING GASEOUS INCLUSIONS FROM MOLTEN MATERIAL

TECHNICAL FIELD

This invention relates to a process and apparatus for making heat-softenable materials using high frequency vibrations.

BACKGROUND ART

Previous efforts in the field of improving the removal of gaseous inclusions in molten materials such as molten glass having included the application of ultrasonics. For example, U.S. Pat. No. 2,635,388 issued on Apr. 23, 1953, discloses a process for glassmaking that includes the step of applying simultaneous heating and vibrating to a glass bath. Another patent assigned to Battelle Memorial Institute, U.S. Pat. No. 4,316,734 issued on Feb. 23, 1982, discloses a method for removing bubbles from molten glass by applying low intensity sonic energy to remove bubbles from the molten glass without creating additional cavitation. The disclosure in the Battelle patent describes driving the growing bubbles away from the source of the sonic energy. Their research was carried out in a model at room temperature with acoustic horns in the floor of the model tank driving the growing bubbles toward the surface of the liquid.

DISCLOSURE OF THE INVENTION

We have developed a method and apparatus for making heat-softenable material using high frequency vibrations. After forming a pool of molten material in the tank of a melting furnace, we have found that applying the vibrations to the molten material in a restricted zone for discharging molten material from the tank improves the bubble removal. The "seeds" or inclusions are slowed down or "pile up" in the channel and are more easily brought to the surface of the molten material. While applying the vibrations to the molten material in the tank may be effective, we have found the convection currents in a large tank interfer with bringing the bubbles to the surface. By applying the high frequency energy to the molten glass in the channel, bubble removal is more effective possibly due to the fact that the molten material flows in only one direction in the channel.

This invention pins the seeds against the unidirectional flow of molten material in the channel to coalesce them into larger bubbles that will bouyantly rise to the surface.

BEST MODE OF CARRYING OUT THE INVENTION

The sonic probe is cylindrical rod of molybdenum that uses piezoelectric ceramics to generate acoustic waves. The probes are placed in glass furnace channel between the melting tank and the forehearths.

The probes enter the channel through the refractory roof or sidewalls openings, into the combustion space and then into the glass through its surface. Since the probes pass through the combustion space, an oxidation protection sheath must surround the probe to protect it from oxidation. The current protective sheath is a platinum alloy tube with a high grade alumina sleeve insert. The probes will extend approximately 2" under the glass surface with the protective sheath approximately extending ½" under the glass surface. When the probes are powered, a spherical area, approximately 3" radius is effected around each probe. The effect is to push seeds away from the probe. Since the probe is positioned in the channel, seeds will push against the glass flow and collide with seeds moving into the sphere of influence. As the seeds collide they grow in size and become large enough to float to the glass surface and break.

Figure 1:
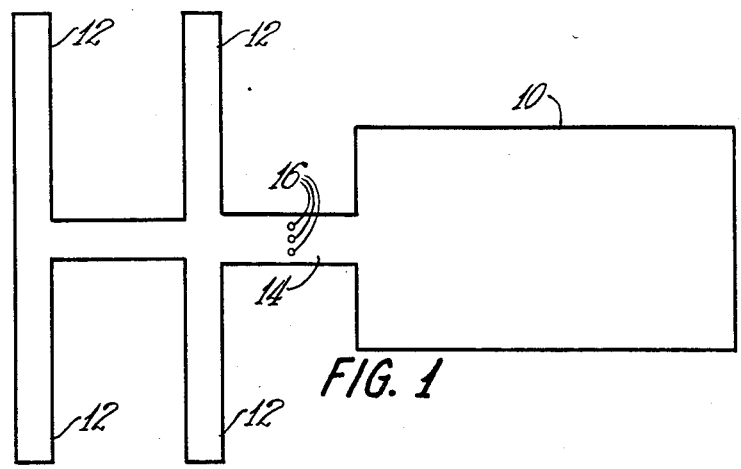
FIG. 1 is a top view showing the general location of the sonic energy probes located in a channel extending from the tank of a melting furnace.

The top view in FIG. 1 shows a typical outline of a glass melting furnace including tank 10, forehearths 12 and channel 14. Sonic probes 16 are located in channel 14. A row of 3 probes 16 appears to be the best arrangement.

Figure 2:
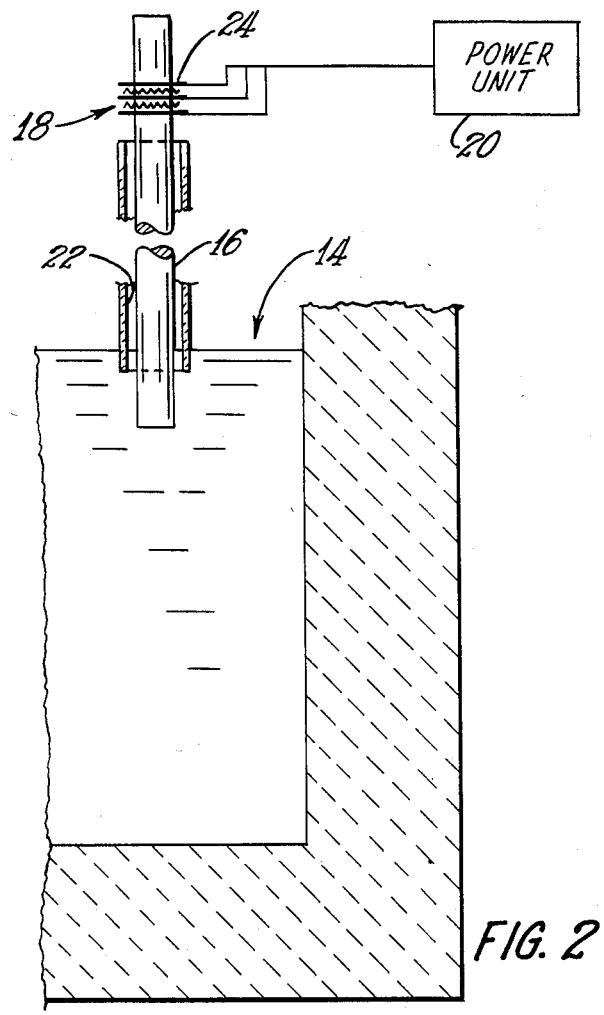
FIG. 2 shows the means for applying high frequency energy in more detail.

FIG. 2 shows a close up of probe 16 in more detail. As shown, the equipment utilized for the imparting of sonic vibration into the glass included sonic probes, probe oxidation protection, and electronic power unit. Sonic probes 16 were 1 inch diameter molybdenum rods with piezoelectric ceramic disks 18 built into one end. Piezoelectric ceramic disks 18 were sandwiched between plate electrodes 24 that had a sine wave voltage being applied to them by the power unit 20. The piezoelectric ceramics were caused to vibrate by this electric signal, which sent vibrations down the molybdenum rod into the glass. Electrical power unit 20, simply provided the correct frequency and voltage input to probes 16. The oxidation protection system was a set of 1½ inch diameter alloy tubes 22 held by an alloy manifold (not shown). Each tube extended down through the combustion space into the glass to form a purged protection for each molybdenum probe 16.

In an embodiment not shown, probes 16 may enter the channel through the side walls above the surface of the molten material. In this embodiment probes 16 probably would be at an angle of 45° and would still require protective sheath 22 since they would be passing through combustion space before entering the molten material.

In another embodiment, probes 16 may be located elsewhere in channel 14 or in one of the forehearths 12. However, our experience has shown that probes 16 should be located before any branching of channel 14 takes place.

The following work has been accomplished towards developing the use of sonic vibration to enhance the fining in glass. Trials were run to quantify the effect sonic vibration has on the seed level for a production furnace.

For the trial, three probes 16 were placed through three predrilled 2 inch diameter evenly spaced holes in the inboard channel roof (not shown). The set of holes were downstream from the furnace skimmer. The electronic power units 20 were installed and lead wire (not shown) runs to the probe position. Compressed air was used by Vortex tranvectors (air horns) to blow air over the piezoelectric transducers for cooling. The alloy tube-manifold system was purged with nitrogen supplied from a bottle of compressed nitrogen. The alloy tubes 22 were in the glass approximately ½ inch, and the molybdenun probe 16 extended ½ inch below the alloy tube.

The probes were inserted in the inboard channel (as shown in FIG. 1). The first three days of operation were successful with lowered seed counts and no effect on forming performance. The attached tables give some specific results for the trial. The table summarizes the seed level by giving average values. The information on the first three days shows good operation with a close to 60 percent decrease in seeds.

Since the data available on seed count with the sonic probe working properly before the protection system failure was only over 3 samplings, the sampling was continued. This additional sampling was necessary to determine the post trial seed count after the furnace returned to steady conditions to see if the seed level returned to pre-trial levels. The average values show the seed levels more than doubled after the trial and returned to levels very close to pre-trial seed levels. Therefore, the return to similar seed levels shows the reduction that occurred during sonic fining was not a fluctuation in seed level, but a real effect caused by the sonic probes.

TABLE

| FURNACE AVERAGE SEED COUNT | | | | |
|---|---|---|---|---|
| | Bushing | | | |
| Trial Phase | A | B | C | D |
| Pre-Trial | 67 | — | 2 | 22 |
| During Trial | 31 | 18 | 4.7 | 2.3 |
| Post Trial | 54 | 61 | 2.1 | 12 |

Industrial Applicability

Typically, the viscosity of the molten material ranges from 50 to 1000 poise with the above trials being carried out at 160 poise. The energy intensity of the sonic energy generally ranges from 10 to 100 watts per square centimeter with trials being carried out at 20 watts/cm$^2$. The frequency of the sonic energy ranged from 30 to 36 kHz and the molten glass had a temperature of 1400° C. More specifically, the horn was operated at a frequency of 33 kHz with 100 watts of input power to each horn.

The above conditions were employed in a typical large horizontal glass melting furnace for the continuous manufacture of glass fibers. The glass undergoes the stages of being prepared by melting batch materials, which float on the molten glass at one end of the furnace, fining the molten glass in a succeeding zone, which in certain cases may be isolated from the first zone by a wall, and conditioning, quieting and cooling the molten glass to a temperature suitable for manufacture into glass products in a conditioning or working zone, which may also be substantially isolated. These furnaces may be gas fired or electric melt furnaces.

A common system for producing glass filaments or fibers includes a furnace having forehearths extending therefrom through which molten glass in the furnace is carried to a plurality of spaced apart bushings or other devices, such as spinners, located along the bottom wall of the forehearths. The forehearths can extend directly from the furnace or can extend as branches from one or more main channels carrying the molten glass from the furnace. The glass from each forehearth flows through openings by gravity into the bushings therebelow with molten glass streams from the bushings or spinners being formed into glass filaments or fibers.

Glass fibers used in the practice of this invention can be "E" glass fibers, well known to those skilled in the art; such fibers are described in U.S. Pat. No. 2,334,961.

Strands of glass fibers are produced by pulling several hundred or more tiny molten streams of glass which issue from holes in the bottom of a molten glass tank over a size applying apron to a gathering shoe which groups the fibers together into a strand. This strand then proceeds to a traverse mechanism and winding drum which provides the pulling action which attenuates the molten glass and coils the strand into a package. The fibers are individually separated at the time that they pass over the size applicator, so that the surfaces of the fibers are substantially completely coated before they are drawn together into a strand. This size acts as a lubricant which separates the individual filaments, and if the filaments are not separate by the size, they will scratch each other and break as they are flexed and drawn over guide eyes in the subsequent twisting, meaning and finishing operations.

We claim:

1. A method for melting heat-softenable material in a melting furnace having a tank, said method including the steps of:

forming a pool of molten material in the tank;
    heating the pool of molten material;
    flowing the molten material away from the tank through a restricted zone to discharge molten material from the tank; and
    applying vibrations to the molten material in the restricted zone to induce migration and coalescence of any inclusions until the amount of inclusions in the restricted zone has been reduced to a desired level.

2. A method for melting heat-softenable material in an electrically heated melting furnace having a tank formed in part by a wall of refractory, said method including the steps of:

forming a pool of molten material in the tank;
    adding a layer of batch material to the surface of the pool;
    electrically heating the pool;
    flowing molten material away from the tank through a channel to discharge molten material from the tank; and
    applying sonic energy to the molten material in the channel to cause any bubbles in the molten material to collide and form larger bubbles and facilitate their movement to the surface of the molten material in the channel.

3. A method according to claim 2 wherein the sonic energy has an energy intensity ranging from 10 to 100 watts per square centimeter and the molten material has a viscosity ranging from 50 to 1000 poise.

4. A method according to claim 3 wherein the energy intensity is 20 watts per square centimeter and viscosity is 160 poise.

5. A method according to claim 2 wherein the sonic energy has a frequency ranging from 30 to 36 kHz.

6. A method according to claim 5 wherein the frequency is 33 kHz.

7. A furnace for melting heat-softenable material, said furnace comprising:

a tank for holding molten material;
    means for supplying heat to the molten material in the tank;
    means for flowing molten material away from the tank, said means being a restricted zone extending from the tank for discharging molten material from the tank; and means for vibrating the molten material in the restricted zone, said vibrating means extending into the molten material contained within the restricted zone.

8. A furnace for electrically melting heat-softenable material, said furnace comprising:
    a tank for holding molten material formed by a bottom, side walls and walls of refractory;
    means for supplying batch material over the molten material in the tank;
    means for electrically supplying heat to the molten material in the tank;
    a channel for flowing molten material away from the tank, said channel extending beyond an end wall thereof; and
    means for applying sonic energy to the molten material in the channel, said sonic means extending into the molten material contained in the channel.

9. A furnace according to claim 8 wherein the means for applying sonic energy is a molybdenum rod with piezoelectric ceramic disks built into one end of the rod including an oxidation protection system of an alloy tube to form a purged protection for each molybdenum rod.

10. A furnace according to claim 9 wherein the ceramic disks are sandwiched between plate electrodes that have a sine wave voltage applied to them by a power unit.

11. A furnace according to claim 10 wherein a set of 3 oxygen protected molybdenum rods are positioned in the channel.

12. A furnace according to claim 8 wherein a plurality of forehearths branch from the channel and the probes are located in the channel between the forehearths and the tank.

* * * * *